US008549379B2

(12) United States Patent
Rodriguez et al.

(10) Patent No.: US 8,549,379 B2
(45) Date of Patent: Oct. 1, 2013

(54) CLASSIFYING A CRITICALITY OF A SOFT ERROR AND MITIGATING THE SOFT ERROR BASED ON THE CRITICALITY

(75) Inventors: Alfred L. Rodriguez, San Jose, CA (US); Nicholas J. Possley, Gilroy, CA (US); Kevin Boshears, San Jose, CA (US); Austin H. Lesea, Los Gatos, CA (US); Jameel Hussein, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 524 days.

(21) Appl. No.: 12/950,171

(22) Filed: Nov. 19, 2010

(65) Prior Publication Data
US 2012/0131417 A1   May 24, 2012

(51) Int. Cl.
*G06F 11/00* (2006.01)

(52) U.S. Cl.
USPC ............................................. 714/763; 714/48

(58) Field of Classification Search
USPC ...................... 714/763, 27, 48, 742
See application file for complete search history.

(56) References Cited

U.S. PATENT DOCUMENTS

| 6,526,559 | B2 | 2/2003 | Schiefele et al. |
| 6,624,654 | B1 | 9/2003 | Trimberger |
| 6,665,813 | B1* | 12/2003 | Forsman et al. ............... 714/15 |
| 7,036,059 | B1 | 4/2006 | Carmichael et al. |
| 7,111,224 | B1 | 9/2006 | Trimberger |
| 7,143,329 | B1 | 11/2006 | Trimberger et al. |
| 7,212,448 | B1 | 5/2007 | Trimberger |
| 7,343,578 | B1 | 3/2008 | Patterson et al. |
| 7,406,573 | B2 | 7/2008 | Huppenthal et al. |
| 7,406,673 | B1 | 7/2008 | Patterson et al. |
| 7,576,557 | B1 | 8/2009 | Tseng et al. |
| 7,852,107 | B1 | 12/2010 | Sundararajan |
| 8,145,959 | B2* | 3/2012 | Mims et al. ................... 714/718 |
| 8,146,028 | B1 | 3/2012 | Lesea |
| 2005/0071572 | A1 | 3/2005 | Nakashima et al. |
| 2006/0036909 | A1* | 2/2006 | VanBuren ..................... 714/15 |
| 2006/0107127 | A1* | 5/2006 | Park et al. ..................... 714/704 |
| 2007/0176627 | A1* | 8/2007 | Ng et al. ..................... 326/14 |
| 2008/0189481 | A1 | 8/2008 | Mayer et al. |
| 2009/0006720 | A1 | 1/2009 | Traister |
| 2010/0202203 | A1 | 8/2010 | Choi et al. |
| 2010/0241900 | A1 | 9/2010 | Check et al. |
| 2012/0238283 | A1 | 9/2012 | Tian et al. |

FOREIGN PATENT DOCUMENTS
WO    WO 2007/103590 A2    9/2007

OTHER PUBLICATIONS

U.S. Appl. No. 12/274,261, filed Nov. 19, 2008, Lesea.
U.S. Appl. No. 13/300,507, filed Nov. 18, 2011, White et al.
Brinkley, Phil et al., *SEU Mitigation Design Techniques for the XQR400XL*, XAPP181 (v1.0), Mar. 15, 2000, pp. 1-14, Xilinx, Inc., San Jose, California, USA.

(Continued)

*Primary Examiner* — Joshua Lohn
(74) *Attorney, Agent, or Firm* — LeRoy D. Maunu

(57) ABSTRACT

Methods and systems mitigate a soft error in an integrated circuit. A map is stored in a memory, and the map specifies a criticality class for each storage bit in the integrated circuit. A mitigative technique is associated with each criticality class. The soft error is detected in a corrupted one of the storage bits. The mitigative technique is performed that is associated with the criticality class specified in the map for the corrupted storage bit.

20 Claims, 3 Drawing Sheets

(56) References Cited

OTHER PUBLICATIONS

Gusmao De Lima Kastensmidt, Fernanda et al., Designing Fault Tolerant Techniques for SRAM-Based FPGAs, *IEEE Design & Test of Computers*, Nov. 2004, pp. 552-562, vol. 21, Issue 6, IEEE Computer Society Press, Los Alamitos, California, USA.

Lima, Fernanda et al., "Designing Fault Tolerant Systems into SRAM-based FPGAs," *Proc. of the 40th Design Automation Conference (DAC'03)* Jun. 2, 2003, pp. 650-655, ACM, New York, New York, USA.

Xilinx. Inc., *LogiCORE™ IP Soft Error Mitigation Controller v1.1 User Guide*, UG764 (v1.1), Sep. 21, 2010, pp. 1-90, Xilinx, Inc., San Jose, CA USA.

Xilinx, Inc., *LogiCORE™ IP Soft Error Mitigation Controller v1.2 User Guide*, UG764 (v1.2), Dec. 14, 2010, pp. 1-96, Xilinx, Inc., San Jose, CA USA.

Xilinx, Inc., *LogiCORE™ IP Soft Error Mitigation Controller v1.3 User Guide*, UG764 (v1.3), Mar. 1, 2011, pp. 1-94, Xilinx, Inc., San Jose, CA USA.

Xilinx, Inc., *LogiCORE™ IP Soft Error Mitigation Controller v2.1 User Guide*, UG764 (v2.1), Jun. 22, 2011, pp. 1-100, Xilinx, Inc., San Jose, CA USA.

Xilinx, Inc., *LogiCORE™ IP Soft Error Mitigation Controller v3.1 User Guide*, UG764 (v3.1), Oct. 19, 2011, pp. 1-104, Xilinx, Inc., San Jose, CA USA.

Xilinx, Inc., *Partial Reconfiguration User Guide*, UG702 (v12.1), May 3, 2010, pp. 1-126, Xilinx, Inc., San Jose, CA USA.

Xilinx, Inc., *Partial Reconfiguration User Guide*, UG702 (v12.3), Oct. 5, 2010, pp. 1-130, Xilinx, Inc., San Jose, CA USA.

Radaelli, Daniele et al., "Investigation of Multi-Bit Upsets in a 150 nm Technology SRAM Device," *IEEE Transactions on Nuclear Science*, Dec. 2005, pp. 2433-2437, vol. 52, No. 6, IEEE, Piscataway, New Jersey, USA.

\* cited by examiner

CLASSIFYING A CRITICALITY OF A SOFT ERROR AND MITIGATING THE SOFT ERROR BASED ON THE CRITICALITY

FIELD OF THE INVENTION

One or more embodiments generally relate to soft errors in integrated circuits, and more particularly to mitigating soft errors in storage of integrated circuits.

BACKGROUND

Soft errors in storage nodes of an integrated circuit cause persistent corruption of the state of the integrated circuit. To prevent improper operation of the integrated circuit, the soft errors should be detected, isolated, and corrected. After detecting a soft error, the integrated circuit can be reset or reconfigured to isolate and correct the soft error. However, resetting the integrated circuit can require a significant amount of time in total system recovery.

High availability is required in certain applications. For example, 99.999% availability or about five minutes of down time per year is often required in telecommunication applications. For some integrated circuits, soft errors produce an amount of system reset time that exceeds the permitted down time. There is a general need to limit the down time during recovery from soft errors.

One or more embodiments of the present invention may address one or more of the above issues.

SUMMARY

In one embodiment, a method is provided for mitigating a soft error in an integrated circuit. A map is stored in a memory, and the map specifies a criticality class for each storage bit in the integrated circuit. A mitigative technique is associated with each criticality class. The soft error is detected in a corrupted one of the storage bits. The mitigative technique is performed that is associated with the criticality class specified in the map for the corrupted storage bit.

In another embodiment, a method is provided for mitigating a soft error in a configuration memory of a programmable integrated circuit. A criticality class is designated for each code block of a design description of a user design. A mitigative technique is associated with each criticality class. A specification is synthesized from the design description. The synthesized specification specifies an implementation of the user design in the programmable logic and interconnect resources of the programmable integrated circuit. The specification specifies that the criticality class of each code block is the criticality class of a subset of the programmable logic and interconnect resources that implements the code block in the implementation. A map is generated from the specification. Storage bits of the configuration memory configure the programmable logic and interconnect resources. The map specifies that the criticality class of the subset implementing each code block is the criticality class of each storage bit that configures the programmable logic and interconnect resources in the subset. The map is stored. The soft error is detected in a corrupted one of the storage bits. The mitigative technique is performed that is associated with the criticality class specified in the map for the corrupted storage bit.

In yet another embodiment, a system for mitigating a soft error is provided. The system includes a programmable integrated circuit and a non-volatile memory. The programmable integrated circuit includes programmable logic and interconnect resources and a configuration memory. The programmable logic and interconnect resources implement a user design in response to configuration data being stored in the configuration memory. The non-volatile memory stores the configuration data for the user design. The user design includes a triply redundant soft-error management circuit. The soft-error management circuit includes a check circuit, a classification circuit, and a correction circuit. The check circuit repeatedly checks for the soft error in a corrupted one of the storage bits in the configuration memory using an error detection code. The classification circuit determines the criticality class of the corrupted storage bit using a map specifying a criticality class for each storage bit. The correction circuit initiates mitigative techniques associated with the criticality classes, and the correction circuit initiates the mitigative technique associated with the criticality class specified in the map for the corrupted storage bit.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
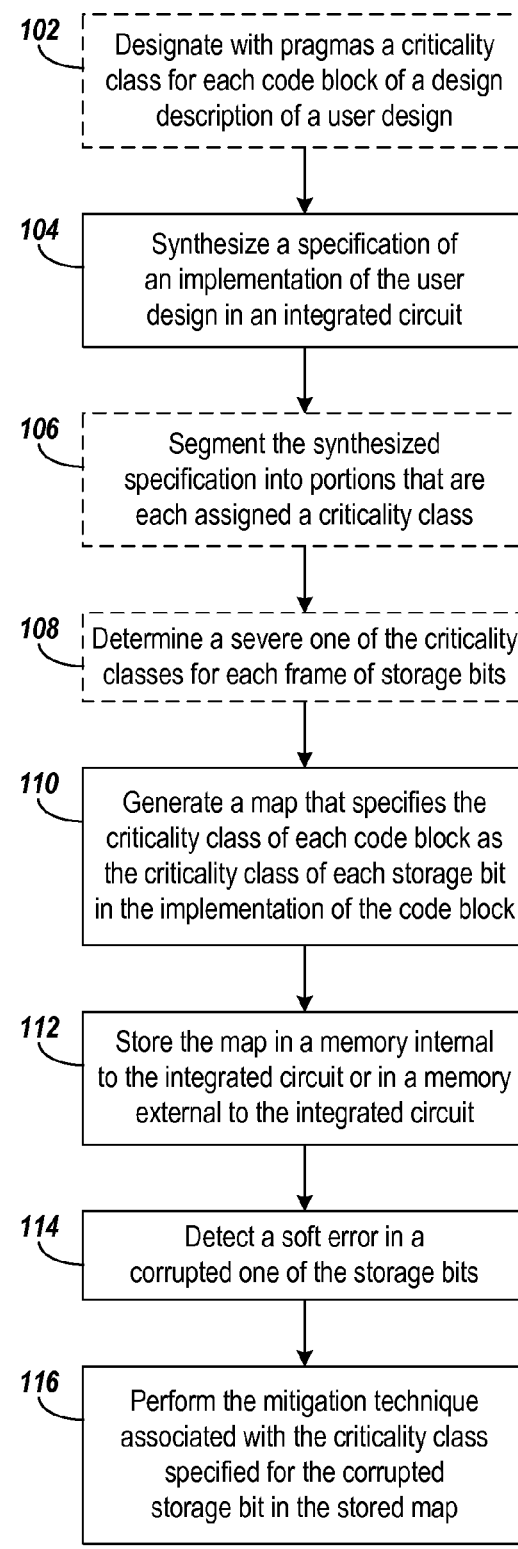
FIG. 1 is a flow diagram of a process for mitigating a soft error in an integrated circuit.

FIG. 1 is a flow diagram of a process for mitigating a soft error in an integrated circuit. The possible soft errors are separated into criticality classes, and an appropriate mitigative technique is selected and performed based on the criticality class of each detected soft error. Because some detected soft errors are handled with a mitigative technique less severe than a full reset of the integrated circuit, the down time required to mitigate multiple soft errors is reduced.

Optional processing is shown with blocks having dotted outlines. In one embodiment, the processing of one or more of blocks 102-116 is performed by one or more processors executing software specifically adapted to perform the designated operations. Blocks 102 and 106 are optional because criticality classes can be designated at block 102 before the synthesis of block 104, or at block 106 after the synthesis of block 104.

At block 102, a criticality class is designated for each code block of a design description of a user design. In one embodiment, a circuit designer specifies the design description in a hardware description language, and the circuit designer inserts one or more pragmas into the design description to declare the criticality class of each code block. In one example, the design description includes a hierarchy of instances of blocks, and a pragma can assign criticality classes to individual instances in the hierarchy. Each code block has the criticality class of the first instance that encompasses the code block in the hierarchy, or a default criticality class when there is no such encompassing instance. In another example, the pragmas specify the criticality classes of the blocks in the hierarchy, such that all the instances of a block have the same criticality class. In yet another example, the pragmas are comments that explicitly specify the extent of each code block, with a code block beginning with an opening comment that specifies the criticality class of the subsequent design description, and the code block ending with a closing comment that resumes the criticality class of any enclosing code block. In this example, the pragmas specify a code block at the granularity of a single statement in the design description.

At block 104, a specification of the integrated circuit is synthesized from the design description. In one embodiment, the specification specifies a netlist of elementary gates that implement the user design. In another embodiment, the specification additionally specifies a placement of the elementary gates in the integrated circuit and a routing of interconnections between the elementary gates. For an example implementation of a user design in a programmable integrated circuit, the specification specifies the specific programmable logic resource implementing each elementary gate and the specific programmable interconnect resources implementing the interconnections between the implemented elementary gates.

In embodiments specifying criticality classes at block 102, the criticality classes are preserved in the specification synthesized at block 104. In one example, each storage bit inherits the criticality class of the code block that the storage bit helps implement. Thus, the specification specifies each storage bit's criticality class, which is the criticality class of the code block from which the storage bit is synthesized. In one embodiment, a storage bit defined by multiple code blocks with differing criticality classes is assigned the most severe criticality class for these code blocks. For an example implementation of a user design in a programmable integrated circuit, each programmable logic and interconnect resource inherits the criticality class of the code block that the programmable resource helps to implement. Furthermore, each configuration storage bit configures a programmable resource, and the criticality class of the configuration bit is the criticality class of the programmable resource.

At block 106, the synthesized specification is segmented into portions, each portion being assigned a criticality class. In one embodiment, each elementary gate in the synthesized netlist is assigned a criticality class. In another embodiment, a graphical representation of the netlist is graphically segmented into various portions, and one of the criticality classes is assigned to each portion. In yet another embodiment for a user design implemented in a programmable integrated circuit, a graphical layout represents the user design implemented in the programmable logic and interconnect resources of the programmable integrated circuit, and the graphical layout is graphically segmented into portions that are each assigned a criticality class.

In certain embodiments, criticality classes designated at block 102 are modified at block 106. Thus, optional blocks 102 and 106 are not mutually exclusive. In one embodiment, the synthesis of block 104 maps the code blocks designated at block 102 to the corresponding portions that can be modified at block 106. In another embodiment, the portions of block 106 are the programmable logic and interconnect resources of a programmable integrated circuit, and the criticality class of each individual programmable resource can be specified or modified at block 106.

In one embodiment, criticality classes are assigned to groups or frames of storage bits. To implement a user design in certain programmable integrated circuits, frames of configuration data configure the configuration memory of the programmable integrated circuit, and each frame of configuration data initializes a corresponding frame of storage bits in the configuration memory. The storage bits in each frame can have different criticality classes, but the overall criticality class of the frame of storage bits is the most severe criticality class of the individual storage bits in the frame. Although certain storage bits in a frame may be assigned a more severe criticality class than necessary, the data to specify the criticality classes is reduced dramatically, because one criticality class is specified per frame instead of one criticality class per storage bit. Thus, at optional block 108, a criticality class is determined for each frame, and this criticality class is a severe one of the criticality classes of the code blocks from which the storage bits in the frame are synthesized.

To reduce the impact of giving some storage bits a more severe criticality class than necessary, the specification can be synthesized at block 104 to preferentially implement code blocks with different criticality classes in the programmable resources for different configuration frames. When code blocks with different criticality classes must be packed together in a single configuration frame, preferentially the packed criticality classes have similar severities.

At block 110, a map is generated from the synthesized specification, and the map specifies the criticality class of each storage bit in the integrated circuit. In one embodiment, the map specifies the criticality class of each storage bit to be the criticality class of the code block from which the storage bit is synthesized. In another embodiment, the criticality class of each storage bit is the criticality class of the frame that includes the storage bit, as determined at block 108.

At block 112, the map is stored in a memory, such as a memory within the integrated circuit or in a memory external to the integrated circuit. In one embodiment, a table is stored that is indexed by an address of the storage bits, and the table includes the criticality class of each storage bit at the address of the storage bit. For an example implementation of a user design in a programmable integrated circuit, the address for each configuration storage bit includes an address of the frame containing the configuration storage bit.

At block 114, a soft error is detected in a corrupted storage bit, and the address is determined for the corrupted storage bit. In one embodiment, a checker repeatedly read groups or frames of storage bits and checks them with an error detecting code, and the checker determines the address of the group or frame containing the corrupted storage bit and possibly an offset address of the specific storage bit that is corrupted in the frame.

At block 116, the mitigative technique is performed that is associated with the criticality class specified for the corrupted storage bit in the stored map. In one embodiment, the map is a table indexed by the address of the storage bits and the criticality class is read from the table at the address of the corrupted storage bit.

The storage bits are classified into various criticality classes depending upon the severity of the effects of corruption of each storage bit. A respective mitigative technique is associated with each criticality class. In one embodiment, a mitigative technique is to send a notification of the soft error or to log information specifying the soft error. Such a mitigative technique can be combined with various error correction techniques, such as those that perform a fail over to redundant logic and subsequently correct the corrupted storage bit, reinitialize some or all of the storage bits from a backup state, correct the corrupted storage bit and reset the integrated circuit, correct the corrupted storage bit and reset a portion of the integrated circuit that corresponds to a code block generating the corrupted storage bit, or correct the corrupted storage bit without any reset. If corruption of a storage bit does not cause any detrimental effects, the mitigative technique might be to completely ignore the corrupted storage bit or merely logging information specifying this soft error. Correction of the corrupted storage bit is accomplished using an error detection and correction code in one embodiment.

Figure 2:
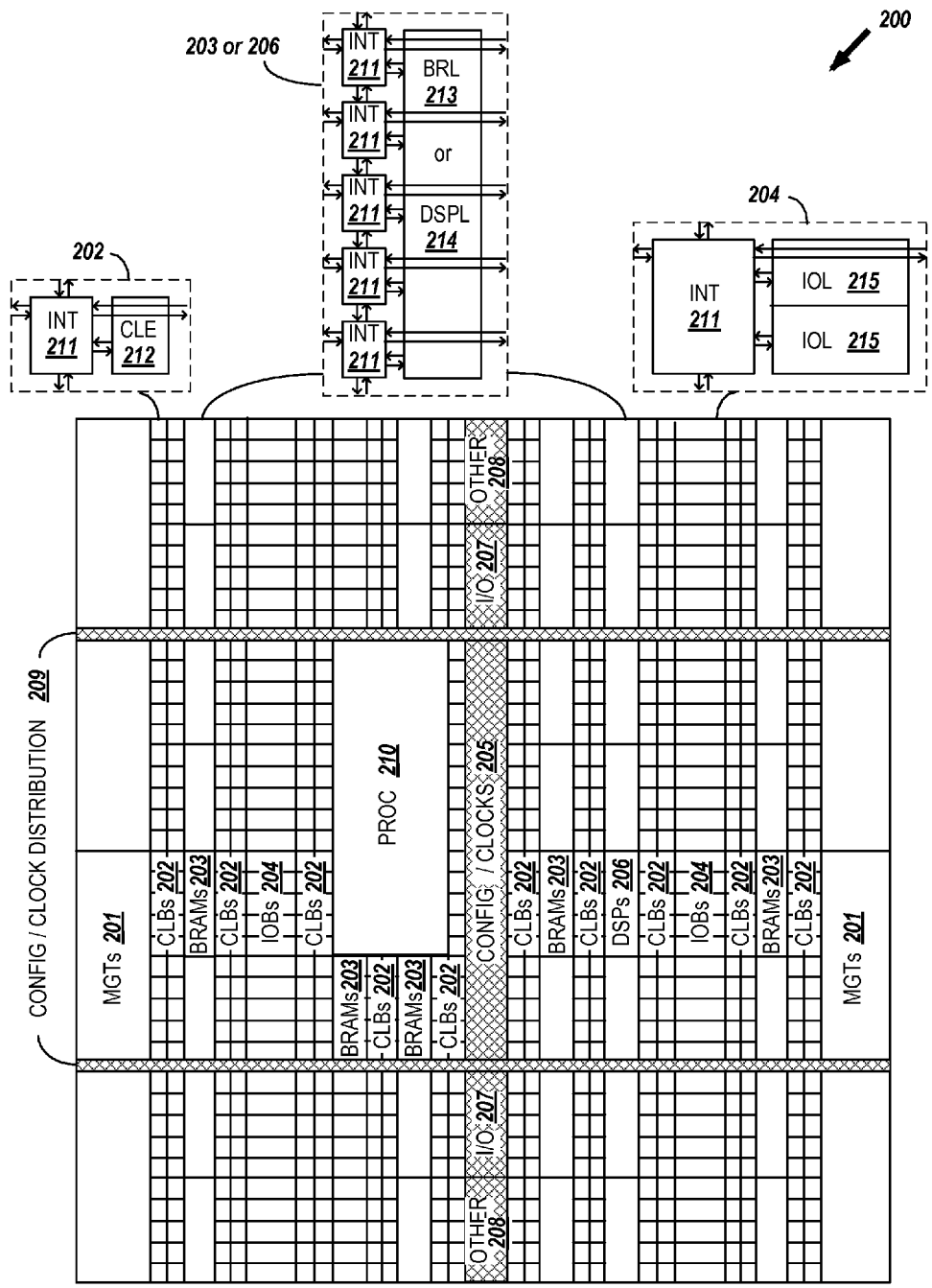
FIG. 2 is a block diagram of an example programmable integrated circuit that is configurable to mitigate a soft error.

FIG. 2 is a block diagram of an example programmable integrated circuit that is configurable to mitigate a soft error. A system for mitigating a soft error, as previously described, can be implemented in the programmable logic and interconnect resources of a programmable integrated circuit.

FPGAs can include several different types of programmable logic blocks in an array. For example, FIG. 2 illustrates an FPGA architecture (200) that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207), for example, e.g., clock ports, and other programmable logic 208 such as digital clock managers, analog to-digital converters, system monitoring logic, and so forth. Some FPGAs also include dedicated processor blocks (PROC 210) and internal and external reconfiguration ports (not shown).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element INT 211 also includes the connections to and from the programmable logic element within the same tile, as shown by the examples included at the top of FIG. 2.

For example, a CLB 202 can include a configurable logic element CLE 212 that can be programmed to implement user logic plus a single programmable interconnect element INT 211. A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element INT 211. As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs.

Note that FIG. 2 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 2 are purely exemplary. For example, in an actual FPGA more than one adjacent column of CLBs is typically included wherever the CLBs appear, to facilitate the efficient implementation of user logic.

Figure 3:
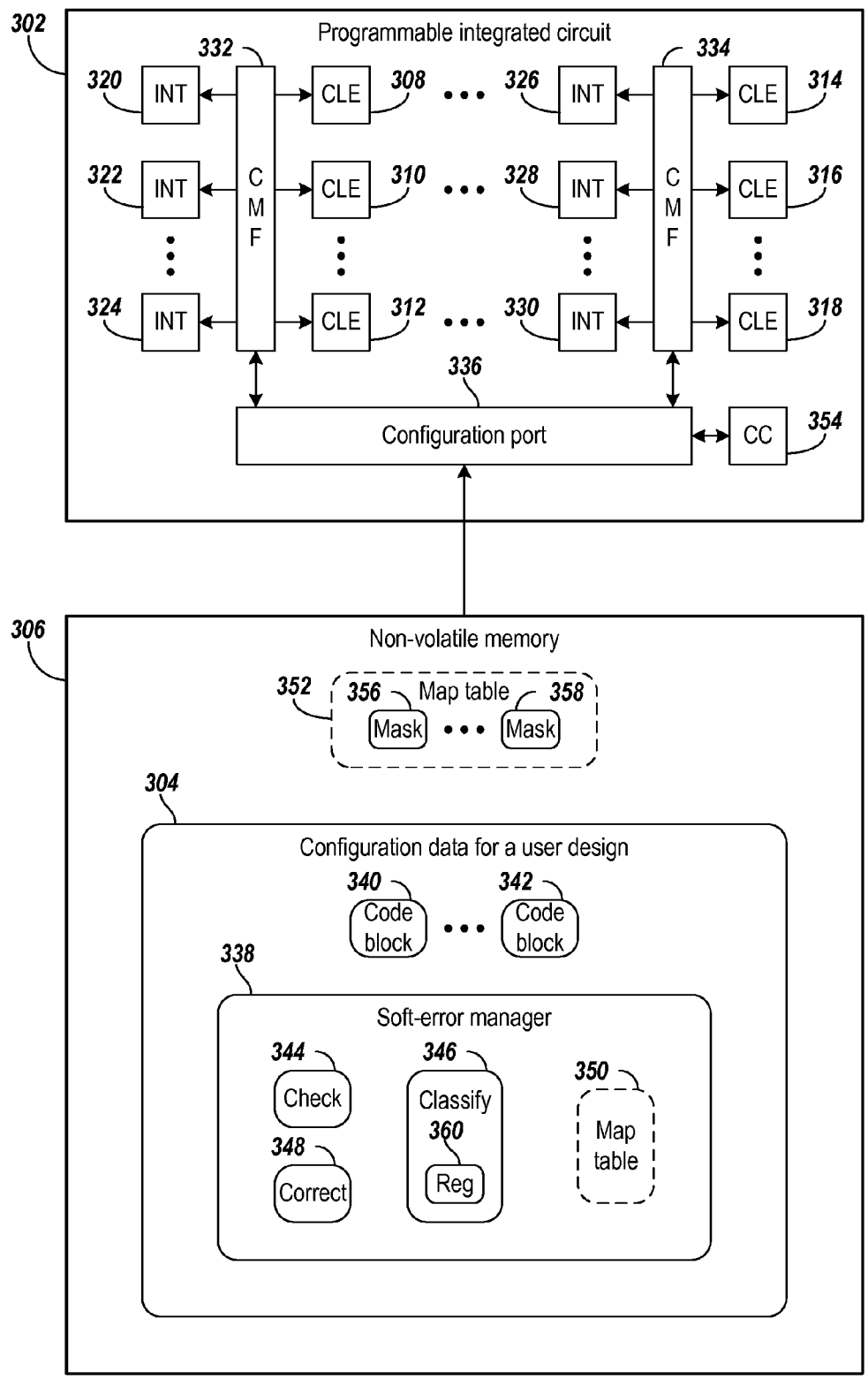
FIG. 3 is a block diagram of system for mitigating a soft error in configuration memory of a programmable integrated circuit.

FIG. 3 is a block diagram of a system for mitigating a soft error in configuration memory of a programmable integrated circuit 302. The programmable integrated circuit 302 is configured to implement a user design with configuration data 304 from non-volatile memory 306.

The programmable integrated circuit 302 includes programmable logic resources 308, 310 through 312, 314, 316 through 318, and programmable interconnect resources 320, 322 through 324, 326, and 328 through 330. Programmable resources 308, 310 through 312, 320, and 322 through 324 are configured by the storage bits in the frame 332 of configuration memory. Similarly, programmable resources 314, 316 through 318, 326, and 328 through 330 are configured by the storage bits in configuration memory frame (CMF) 334. During configuration of programmable integrated circuit 302 to implement the user design, configuration memory frames 332 through 334 are initialized via configuration port 336 with corresponding frames of the configuration data 304 stored in non-volatile memory 306.

The non-volatile memory 306 stores the configuration data 304 for the user design. The configuration data 304 includes configuration data for implementing a soft-error manager 338 and code blocks 340 though 342 of the user design. Associated with code blocks 340 through 342 are designated criticality classes. The subset of programmable resources 308, 310 through 312, 314, 316 through 318, 320, 322 through 324, 326, and 328 through 330 that implement code block 340 have the designated criticality class of code block 340, and the storage bits from configuration memory frames 332 through 334 that configure this subset of the programmable resources also have the designated criticality class of code block 340. Similarly, the storage bits in configuration memory frames 332 through 334 that configure the programmable resources 308, 310 through 312, 314, 316 through 318, 320, 322 through 324, 326, and 328 through 330 to implement code block 342 have the designated criticality class of code block 342.

In one embodiment, the soft-error manager 338 specified in configuration data 304 has a severe criticality class, and the associated mitigative techniques involve reconfiguration of programmable integrated circuit 302 with configuration data 304 followed by a reset of programmable integrated circuit 302. In another embodiment, the soft-error manager 338 specified in configuration data 304 is triply-redundant to prevent serious effects from a soft error that corrupts the storage bits in the configuration memory frames 332 through 334 that configure the programmable resources 308, 310 through 312, 314, 316 through 318, 320, 322 through 324, 326, and 328 through 330 to implement the soft-error manager 338. A triply-redundant soft error manager 338 includes a voting circuit and three copies or instances of each logic circuit, such as the circuits 344, 346, and 348 specified in configuration data 304. When the outputs of one instance of the circuit does not match the outputs of the other two instances of the circuit, but the outputs of the other two instances match, the voting circuit picks the matching outputs from the two instances that are in agreement. Thus, a failure confined to one instance of a circuit does not affect the triply-redundant soft error manager.

In addition, the voting circuit can be a redundant voting circuit to keep the soft error manager unaffected by many failures in the redundant voting circuit.

The soft-error manager 338 specified in configuration data 304 includes configuration data for a check circuit 344, a classification circuit 346, and a correction circuit 348 in one embodiment. The check circuit 344 specified in configuration data 304 repeatedly checks for a soft error corrupting a storage bit in the configuration memory frames 332 and 334 using an error detection code. The classification circuit 346 specified in configuration data 304 determines the criticality class of the corrupted storage bit, using a map table 350 or 352 specifying a criticality class for each storage bit. The correction circuit 348 specified in configuration data 304 selects and initiates the mitigative technique associated with the criticality class specified for the corrupted storage bit in the map table 350 or 352. The specified correction circuit 348 corrects the corrupted storage bit, e.g., using an error correction code. In one embodiment, the error correction code is also the error detection code of the specified check circuit 344.

In one embodiment, the programmable integrated circuit 302 includes a programmable checker logic resource (CC) 354 dedicated to checking for the corruption of configuration memory frames 332 through 334. In this embodiment, the configuration data 304 includes configuration data for implementing the specified check circuit 344 in the dedicated checker resource 354. This configuration data includes an expected value of cyclic redundancy check over the configuration memory frames 332 through 334, or enables continuous checking of the configuration memory frames 332 through 334 using an error detecting code. Each of the configuration memory frames 332 through 334 includes additional storage bits that do not configure the programmable resources 308, 310 through 312, 314, 316 through 318, 320, 322 through 324, 326, and 328 through 330, and these additional storage bits can be dedicated to storing the check bits of the error detecting code. Depending upon its configuration, the checker resource 354 can continuously check configuration memory frames 332 through 334 using the cyclic redundancy check and/or the error detecting code.

In this embodiment having a dedicated programmable checker resource 354, the specified classification circuit 346 and the specified correction circuit 348 are implemented in a subset of the programmable resources 308, 310 through 312, 314, 316 through 318, 320, 322 through 324, 326, and 328 through 330. To limit the impact of corruption of the portion of the configuration memory frames 332 through 334 for implementing specified classification circuit 346 and the specified correction circuit 348, specified classification circuit 346 and the specified correction circuit 348 can be triply-redundant circuits.

In one embodiment, the implementation of the specified classification circuit 346 in programmable integrated circuit 302 accesses a map table 352 in the non-volatile memory 306 to determine the criticality class of a soft error detected by specified check circuit 344. The specified classification circuit 346 indexes into the map table 352 with an address of the corrupted storage bit from specified check circuit 344. The map table 352 includes respective masks 356 through 358 for the configuration memory frames 332 through 334. Upon detecting a soft error, the specified check circuit 344 provides a frame address for the corrupted storage bit and either an offset address of the corrupted storage bit in the frame or a vector indicating which storage bits in the frame are corrupted. The specified classification circuit 346 reads the mask for the frame address from map table 352. The specified classification circuit 346 either selects the criticality class at the offset address in this mask, or the specified classification circuit 346 masks this mask with the vector to determine the criticality class. For an example with two criticality classes, the specified classification circuit 346 selects a severe criticality class for a non-zero masking result and another criticality class for a masking result of zero. The specified correction circuit 348 performs the mitigative technique that is associated with the selected criticality class.

In another embodiment, the map table is stored in another memory (not shown) in the system for mitigating a soft error.

In yet another embodiment, the map table 350 is stored within the configuration data 304 for the user design. A specification of an implementation of the user design is synthesized from a design description of the user design. The design description of the user design includes a soft-error manager that specifies a map table, but specifies uninitialized contents for the map table. The synthesized specification implements the uninitialized map table in one or more memories of the programmable integrated circuit 302, such as one or more of the BRAMs 203 of FIG. 2. The criticality classes contained in the map table are generated from the synthesized specification. Configuration data 304 is also generated from the synthesized specification, and this includes merging the generated criticality classes into the map table 350. Thus, when programmable integrated circuit 302 is configured with the configuration data 304, certain memories of the programmable integrated circuit 302 are initialized with the designated criticality classes from map table 350.

The storage bits in configuration memory frames 332 through 334 are classified into various criticality classes, depending upon the severity of the effects of corruption of each storage bit. A respective mitigative technique is associated with each criticality class. In one embodiment, a mitigative technique is sending a notification of the soft error or logging information specifying the soft error. Such a mitigative technique can also be combined with various error correction techniques, such as: reinitializing the configuration memory frames 332 through 334 to reconfigure the programmable resources 308, 310, 312, 314, 316, 318, 320, 322, 324, 326, 328 through 330 and then resetting the programmable integrated circuit 302; reinitializing each configuration memory frame 332 through 334 that configures the programmable logic and interconnect resources for the code block corresponding to the corrupted storage bit and then resetting the programmable integrated circuit; correcting the corrupted storage bit and resetting the programmable integrated circuit; correcting the corrupted storage bit and resetting the programmable logic and interconnect resources for the code block corresponding to the corrupted storage bit; and simply correcting the corrupted storage bit.

In one embodiment, the configuration data 304 for classification circuit 346 includes a status register 360 that is implemented along with the specified classification circuit 346 in the programmable resources 308, 310, 312, 314, 316, 318, 320, 322, 324, 326, and 328 through 330. Alternatively, a code block 340 includes the status register. In one example, a code block 342 normally has a severe criticality class and status register 360 indicates when code block 342 is not operating on critical data. When specified check circuit 344 detects a soft error, specified classification circuit 346 determines the appropriate criticality class for the soft error given the current value of the status register 360.

In one embodiment, the map table 350 or 352 specifies a respective criticality class for each combination of one of the storage bits configuration in memory frames 332 through 334 and each possible state of the status register 360. The classification circuit determines the criticality class specified in the map table 350 or 352 for the combination of the corrupted storage bit and the current state of a status register 360. The classification circuit determines the criticality class is severe, for example, when the current state of status register 360 indicates the corrupted storage bit configures programmable resources that are currently operating on critical data. The classification circuit determines the criticality class is not severe when the current state of status register 360 indicates the corrupted storage bit configures programmable resources that are idle or not currently operating on critical data. In one embodiment, an address of the corrupted storage bits selects one of the masks 356 though 358 in map table 352, and the current value of the status register 360 selects the appropriate criticality class embedded in the selected mask.

There is more than one status register, in one embodiment. In one example, the map table 350 or 352 includes an identifier value for each storage bit in configuration in memory frames 332 through 334, and the identifier value selects status register 360 or other status registers. Pragmas specify the status register associated with each code block 340 through 342 and the criticality classes for the possible values of the status register. When specified check circuit 344 detects a soft error, specified classification circuit 346 can determine the appropriate criticality class for the current operating state of the code block affected by the soft error.

The embodiments of the present invention are thought to be applicable to a variety of methods and systems for mitigating soft errors in integrated circuits. Other aspects and embodiments will be apparent to those skilled in the art from consideration of the specification and practice of the embodiments disclosed herein. The embodiments may be implemented as one or more processors configured to execute software, as an application specific integrated circuit (ASIC), or as a logic on a programmable logic device. It is intended that the specification and illustrated embodiments be considered as examples only, with a true scope and spirit of the invention being indicated by the following claims.

What is claimed is:

1. A method for mitigating a soft error in an integrated circuit, comprising:
    storing in a memory, a map that specifies one of a plurality of criticality classes for each of a plurality of storage bits in the integrated circuit, wherein one of a plurality of mitigative techniques is associated with each criticality class;
    detecting the soft error in a corrupted one of the storage bits; and
    performing the mitigative technique associated with the criticality class specified in the map for the corrupted storage bit.

2. The method of claim 1, wherein the memory is external to the integrated circuit.

3. The method of claim 1, wherein the memory is within the integrated circuit.

4. The method of claim 1, further comprising:
    designating one of the criticality classes for each of a plurality of code blocks of a design description of the integrated circuit;
    synthesizing a specification of the integrated circuit from the design description, wherein, for each storage bit, the specification specifies the criticality class of the code block from which the storage bit is synthesized; and
    generating the map from the specification, wherein, for each storage bit, the map specifies the criticality class of the storage bit that is the criticality class of the code block from which the storage bit is synthesized.

5. The method of claim 4, wherein:
    the designating includes inserting at least one pragma for each code block into the design description in a hardware description language; and
    the at least one pragma declares the criticality class of the code block and an extent of the code block in the design description.

6. The method of claim 4, wherein the designating includes graphically segmenting a plurality of portions of the specification synthesized from the design description, and assigning one of the criticality classes to each portion.

7. The method of claim 1, wherein:
    the storing of the map includes storing a table indexed by addresses of the storage bits, the table including the criticality class of each storage bit at the address of the storage bit;
    the detecting of the soft error in the corrupted storage bit includes determining the address of the corrupted storage bit; and
    the performing of the mitigative technique includes reading the criticality class that is in the table at the address, and performing the mitigative technique that is associated with the criticality class.

8. The method of claim 1, wherein:
    the storing of the map includes storing a table indexed by an address of a plurality of frames of the storage bits, the table including a mask for the storage bits in each frame at the address of the frame;
    the detecting of the soft error in the corrupted storage bit includes determining the address of the frame which includes the corrupted storage bit and a vector indicating which of the storage bits in the frame is the corrupted storage bit; and
    the performing of the mitigative technique includes masking the vector with the mask read from the table at the address, and performing the mitigative technique that is associated with the criticality class in a result of the masking.

9. The method of claim 1, further comprising:
    designating one of the criticality classes for each of a plurality of code blocks of a design description of the integrated circuit;
    synthesizing a specification of the integrated circuit from the design description, wherein, for each storage bit, the specification specifies the criticality class of the code block from which the storage bit is synthesized;
    determining, for each of a plurality of frames of the storage bits, a most severe one of the criticality classes of the code blocks from which the storage bits in the frame are synthesized; and
    generating the map from the specification, wherein the map specifies the criticality class for each storage bit as the most severe criticality class of the frame that includes the storage bit;
    wherein:
        the storing of the map includes storing a table indexed by addresses of the frames, the table including the most severe criticality class of each frame at the address of the frame;
        the detecting of the soft error in the corrupted storage bit includes determining the address of the frame that includes the corrupted storage bit; and
        the performing of the mitigative technique includes performing the mitigative technique that is associated with the most severe criticality class in the table at the address.

10. The method of claim 1, wherein:
the criticality classes include first, second, third, fourth, fifth, sixth, seventh, eighth, ninth, tenth, eleventh, and twelfth criticality classes;
the mitigative technique associated with the first criticality class is sending a notification of the soft error, performing a fail over to redundant logic, and subsequently correcting the corrupted storage bit;
the mitigative technique associated with the second criticality class is performing a fail over to redundant logic, and subsequently correcting the corrupted storage bit;
the mitigative technique associated with the third criticality class is sending a notification of the soft error, and reinitializing the storage bits from a backup state;
the mitigative technique associated with the fourth criticality class is reinitializing the storage bits from a backup state;
the mitigative technique associated with the fifth criticality class is sending a notification of the soft error, correcting the corrupted storage bit, and resetting the integrated circuit;
the mitigative technique associated with the sixth criticality class is correcting the corrupted storage bit, and resetting the integrated circuit;
the mitigative technique associated with the seventh criticality class is sending a notification of the soft error, correcting the corrupted storage bit, and resetting a portion of the integrated circuit that corresponds to a code block generating the corrupted storage bit;
the mitigative technique associated with the eighth criticality class is correcting the corrupted storage bit, and resetting a portion of the integrated circuit that corresponds to a code block generating the corrupted storage bit;
the mitigative technique associated with the ninth criticality class is sending a notification of the soft error, and correcting the corrupted storage bit;
the mitigative technique associated with the tenth criticality class is correcting the corrupted storage bit;
the mitigative technique associated with the eleventh criticality class is sending a notification of the soft error and otherwise ignoring the corrupted storage bit; and
the mitigative technique associated with the twelfth criticality class is ignoring the corrupted storage bit.

11. The method of claim 1, wherein:
the detecting of the soft error includes repeatedly reading and checking the storage bits using an error detection and correction code, and
the performing of the mitigative technique includes correcting the corrupted storage bit in response to the mitigative technique that is associated with the criticality class specified in the map for the corrupted storage bit, the corrupted storage bit being corrected using the error detection and correction code.

12. The method of claim 1, wherein:
the storing of the map includes storing the map that, for at least one of the storage bits, specifies a respective one of the criticality classes for each of a plurality of states;
the detecting of the soft error includes detecting the soft error in the corrupted one of the at least one storage bit; and
the performing of the mitigative technique includes determining the respective criticality class specified in the map for the corrupted storage bit and the state of a status register of the integrated circuit, and performing the mitigative technique that is associated with the respective criticality class.

13. A method for mitigating a soft error in a configuration memory of a programmable integrated circuit, comprising:
on one or more processors, executing instructions for causing the one or more processors to perform operations including:
designating one of a plurality of criticality classes for each of a plurality of code blocks of a design description of a user design;
wherein one of a plurality of mitigative techniques is associated with each criticality class;
synthesizing, from the design description, a specification of an implementation of the user design in a plurality of programmable logic and interconnect resources of the programmable integrated circuit:
wherein the specification specifies that the criticality class of each code block is the criticality class of a subset of the programmable logic and interconnect resources that implements the code block in the implementation;
generating a map from the specification;
wherein a plurality of storage bits of the configuration memory configure the programmable logic and interconnect resources, and the map specifies that the criticality class of the subset implementing each code block is the criticality class of each storage bit that configures the programmable logic and interconnect resources in the subset;
storing the map in a memory;
detecting the soft error in a corrupted one of the storage bits; and
performing the mitigative technique associated with the criticality class specified in the map for the corrupted storage bit.

14. The method of claim 13, wherein the storing the map includes:
generating configuration data from the specification, including merging the map into the configuration data; and
storing the configuration data in the configuration memory of the programmable integrated circuit;
wherein, in response to the storing, the programmable logic and interconnect resources implement the implementation of the user design, including the memory in which the map is stored; and
wherein the user design includes a soft-error manager that includes the map, and the implementation of the soft-error manager performs the detecting of the soft error in the corrupted storage bit and the performing of the mitigative technique associated with the criticality class specified for the corrupted storage bit.

15. The method of claim 13, further comprising:
generating configuration data from the specification; and
storing the configuration data in the configuration memory of the programmable integrated circuit, wherein, in response to the storing, the programmable logic and interconnect resources implement the implementation of the user design;
wherein the user design includes a soft-error manager, and the implementation of the soft-error manager performs the detecting of the soft error and the performing of the mitigative technique.

16. The method of claim 13, wherein:
the storing of the map includes storing a table indexed by addresses of a plurality of frames of the storage bits, the table including a mask for the storage bits in each frame at the address of the frame;

the detecting of the soft error in the corrupted storage bit includes determining the address of the frame that includes the corrupted storage bit and a vector indicating which of the storage bits in the frame is the corrupted storage bit; and the performing of the mitigative technique includes masking the vector with the mask read from the table at the address, and performing the mitigative technique that is associated with the criticality class in a result of the masking.

17. The method of claim 13, wherein:

the criticality classes include first, second, third, fourth, fifth, sixth, seventh, eighth, ninth, tenth, eleventh, twelfth, thirteenth, and fourteenth criticality classes;

the mitigative technique associated with the first criticality class is sending a notification of the soft error, reinitializing the storage bits to reconfigure the programmable logic and interconnect resources, and resetting the programmable integrated circuit;

the mitigative technique associated with the second criticality class is reinitializing the storage bits to reconfigure the programmable logic and interconnect resources, and resetting the programmable integrated circuit;

the mitigative technique associated with the third criticality class is sending a notification of the soft error, reinitializing the storage bits that configure the programmable logic and interconnect resources in the subset configured by the corrupted storage bit, and resetting the programmable integrated circuit;

the mitigative technique associated with the fourth criticality class is reinitializing the storage bits that configure the programmable logic and interconnect resources in the subset configured by the corrupted storage bit, and resetting the programmable integrated circuit;

the mitigative technique associated with the fifth criticality class is sending a notification of the soft error, reinitializing the storage bits that configure the programmable logic and interconnect resources in the subset configured by the corrupted storage bit, and resetting the subset of the programmable logic and interconnect resources;

the mitigative technique associated with the sixth criticality class is reinitializing the storage bits that configure the programmable logic and interconnect resources in the subset configured by the corrupted storage bit, and resetting the subset of the programmable logic and interconnect resources;

the mitigative technique associated with the seventh criticality class is sending a notification of the soft error, correcting the corrupted storage bit, and resetting the programmable integrated circuit;

the mitigative technique associated with the eighth criticality class is correcting the corrupted storage bit, and resetting the programmable integrated circuit;

the mitigative technique associated with the ninth criticality class is sending a notification of the soft error, correcting the corrupted storage bit, and resetting the programmable logic and interconnect resources in the subset configured by the corrupted storage bit;

the mitigative technique associated with the tenth criticality class is correcting the corrupted storage bit, and resetting the programmable logic and interconnect resources in the subset configured by the corrupted storage bit;

the mitigative technique associated with the eleventh criticality class is sending a notification of the soft error, and correcting the corrupted storage bit;

the mitigative technique associated with the twelfth criticality class is correcting the corrupted storage bit;

the mitigative technique associated with the thirteenth criticality class is sending a notification of the soft error and otherwise ignoring the corrupted storage bit; and the mitigative technique associated with the fourteenth criticality class is ignoring the corrupted storage bit.

18. A system for mitigating a soft error, comprising:

a programmable integrated circuit including programmable logic and interconnect resources and a configuration memory, the programmable logic and interconnect resources implementing a user design in response to configuration data being stored in the configuration memory; and a non-volatile memory coupled to the programmable integrated circuit, the non-volatile memory storing the configuration data for the user design:

wherein the user design includes a triply-redundant soft-error management circuit that includes:

a check circuit that repeatedly checks for the soft error in a corrupted one of a plurality storage bits in the configuration memory using an error detection code;

a classification circuit coupled to the check circuit, wherein the classification circuit is configured to use a map specifying one of a plurality of criticality classes for each storage bit to determine the criticality class of the corrupted storage bit in response to the check circuit; and a correction circuit coupled to the classification circuit for initiating a plurality of mitigative techniques associated with the criticality classes, the correction circuit being configured to initiate the mitigative technique associated with the criticality class determined by the classification circuit.

19. The system of claim 18, wherein:

the map specifies a respective one of the criticality classes for each combination of one of the storage bits and one of a plurality of states;

the classification circuit is further configured to determine the respective criticality class specified in the map for the combination of the corrupted storage bit and the state of a status register of the classification circuit; and the correction circuit is further configured to initiate the mitigative technique that is associated with the respective criticality class.

20. The system of claim 18, wherein:

the correction circuit is configured to correct the corrupted storage bit in response to the mitigative technique that is associated with the criticality class specified in the map for the corrupted storage bit; and the correction circuit is further configured to correct the corrupted storage bit using the error detection code that is an error correction code.

\* \* \* \* \*